(12) United States Patent
Friedrich et al.

(10) Patent No.: US 12,322,989 B2
(45) Date of Patent: Jun. 3, 2025

(54) BATTERY PACK WITH PARALLEL CONDUCTOR ROUTING

(71) Applicant: GM GLOBAL TECHNOLOGY OPERATIONS LLC, Detroit, MI (US)

(72) Inventors: Jacob H. Friedrich, Willoughby, OH (US); Robert J. Heydel, Jr., Clawson, MI (US); Luke R. Barton, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 568 days.

(21) Appl. No.: 17/717,274

(22) Filed: Apr. 11, 2022

(65) Prior Publication Data

US 2023/0327462 A1    Oct. 12, 2023

(51) Int. Cl.
*H02J 7/00* (2006.01)
*B60L 50/60* (2019.01)
*B60L 58/19* (2019.01)

(52) U.S. Cl.
CPC ............ *H02J 7/0024* (2013.01); *B60L 50/66* (2019.02); *B60L 58/19* (2019.02)

(58) Field of Classification Search
CPC .......... H02J 7/0024; B60L 50/66; B60L 58/19
USPC ................................................. 320/116, 126
See application file for complete search history.

(56) References Cited

U.S. PATENT DOCUMENTS

| | | | |
|---|---|---|---|
| 11,289,921 B1* | 3/2022 | Hall | H02J 7/00304 |
| 2009/0208836 A1* | 8/2009 | Fuhr | H01M 50/107 |
| | | | 429/178 |
| 2017/0201103 A1* | 7/2017 | Jeon | H02J 7/0014 |
| 2019/0288528 A1* | 9/2019 | Greetham | H01M 10/0445 |

* cited by examiner

*Primary Examiner* — Zixuan Zhou
(74) *Attorney, Agent, or Firm* — Quinn IP Law

(57) ABSTRACT

A battery pack for a direct current (DC) voltage bus includes a battery disconnect unit (BDU) operable for controlling a connection state of the battery pack with respect to the DC voltage bus, first and second battery sections, and six transfer conductors, e.g., busbars or cables/wires. The first battery section has first and second battery modules with corresponding battery cells. The first and second battery modules are connected in series. The first and second battery sections are connected in parallel. The second battery section has third and fourth battery modules each with additional battery cells, with the third and fourth battery modules connected in series. The six transfer conductors collectively interconnect the battery modules, sections, and BDU. A total battery current is divided equally between the battery sections, with the transfer conductors being rated for half of the total battery current.

20 Claims, 3 Drawing Sheets

BATTERY PACK WITH PARALLEL CONDUCTOR ROUTING

INTRODUCTION

Multi-cell batteries are commonly used as direct current (DC) power supplies aboard a wide range of battery electric systems. In an electric vehicle, for instance, a propulsion battery pack is often constructed from one or more interconnected battery modules, with each constituent battery module of the battery pack having an application-suitable number of cylindrical, prismatic, or pouch-style electrochemical battery cells. The propulsion battery pack is then connected to a high-voltage electrical load, e.g., one or more polyphase/alternating current electric traction motors, a power inverter module, a voltage converter, and the like. Low-voltage components such as a 12-volt battery in turn are connected to an auxiliary voltage bus on a low-voltage side of the voltage converter. The various high-voltage components are likewise connected to the voltage converter on a separate high-voltage side thereof.

SUMMARY

Disclosed herein is a parallel-connected battery pack for use in a high-energy battery electric system. The battery pack includes multiple battery modules each with an application-suitable number and configuration of electrochemical battery cells. The battery modules are separated into parallel-connected battery sections. In this manner, a total battery current flowing through the battery pack is evenly divided across the two parallel-connected battery sections, with busbars, cables, or other suitable transfer conductors of the battery pack being rated for half of the total battery current. That is, the transfer conductors are sized and constructed to conduct half of the total battery current without degradation or overheating, i.e., the transfer conductors are provided with a reduced cross-sectional area relative to the size and construction that would be needed to conduct the total battery current in its entirety.

As appreciated by those skilled in the art, a key mass contributor in the construction of a high-voltage electrochemical battery pack is found in the various electrical hardware connections. These connections are physically embodied as large transfer conductors. Ordinarily, the constituent battery sections of a HV propulsion battery packs are connected in series, such that a total battery pack current flows through each transfer conductor. As a result, the individual transfer conductors must be rated for, i.e., sized to conduct with minimal losses, the full amount of the total battery current. In contrast, the battery sections of the battery pack contemplated herein are connected in parallel, such that the transfer conductors must conduct just half of the aforementioned total battery current. A resulting reduction in current loading of the transfer conductors permits substantial downsizing of the busbars, with attendant benefits including a reduction in mass, packaging space, and conductive material relative to that which is required to achieve a traditional series-connected configuration.

In an exemplary embodiment, a battery pack for a direct current (DC) voltage bus includes a battery disconnect unit (BDU) operable for controlling a connection state of the battery pack with respect to the DC voltage bus, first and second battery sections, and a plurality of transfer conductors. The first battery section has separate first and second battery modules each with corresponding electrochemical battery cells. The first and second battery modules are connected in series within the first pack section. The first and second battery sections are connected in parallel. The second battery section in this embodiment has third and fourth battery modules each with additional electrochemical battery cells, with the third and fourth battery modules connected in series within the second battery section. The transfer conductors collectively interconnect the battery modules, sections, and the BDU. A total battery current flowing through/provided by the HV battery pack is divided equally between the battery sections, with the transfer conductors each being rated for half of the total battery current.

The transfer conductors in one or more embodiments are constructed as flat busbars, e.g., as copper traces, plates, or other busbars. However, the present teachings may also be applied to electrical cables or other transfer conductor types.

The transfer conductors may include a first transfer conductor that connects a positive terminal of the first battery module to a negative terminal of the second battery module, and a second busbar that connects a positive terminal of the third battery module to a negative terminal of the second battery module. A third transfer conductor may form an elongated connection between the BDU and a negative terminal of the first battery module.

In some disclosed embodiments, a fourth transfer conductor connects the BDU to a positive terminal of the second battery module, while a fifth busbar connects the BDU to a negative terminal of the third battery module. A sixth transfer conductor may connect the BDU to a positive terminal of the fourth battery module.

In an optional construction, the electrochemical battery cells are embodied as lithium-ion battery cells. The battery pack in a non-limiting implementation has a voltage capability or pack voltage of 400-volts and a total battery current of 1000-amps, such that the transfer conductors are each rated for 500-amps.

Another aspect of the disclosure includes a motor vehicle having a vehicle body, a set of road wheels connected to the vehicle body, and a battery electric system. The battery electric system for its part includes a rotary electric machine connected to one or more of the road wheels, and a propulsion battery pack connected to and configured to power the rotary electric machine. The propulsion battery pack, which provides a total battery current to the rotary electric machine, includes a BDU, and a first battery section having first and second battery modules each with a corresponding plurality of electrochemical battery cells. The first battery module is connected in series with the second battery module, as noted above. A second battery section in this particular embodiment is connected in parallel with the first battery section, and has third and fourth battery modules each having another corresponding plurality of electrochemical battery cells. The third battery module is connected in series with the fourth battery module.

In a possible embodiment, the battery electric system includes a power inverter module (PIM) operable for inverting a DC voltage from the propulsion battery pack into an alternating current (AC) voltage. The rotary electric machine in such an embodiment may be an AC traction motor configured to be energized by the AC voltage from the PIM.

Also disclosed herein is a battery pack having the above-noted BDU, first and second battery sections, and six busbars. The first battery section includes series-connected first and second battery modules each having a corresponding plurality of electrochemical battery cells. The second battery section, which is connected in parallel with the first battery section, has third and fourth battery modules each with another corresponding plurality of electrochemical battery cells. The third battery module is connected in series with the fourth battery module. In this embodiment, the six busbars collectively interconnect the battery sections, modules, and BDU, with the total battery current once again divided equally between the two battery sections, and the six busbars once again being rated for half of the total battery current.

The six busbars in this particular embodiment include a first busbar arranged to connect a positive terminal of the first battery module to a negative terminal of the second battery module, a second busbar arranged to connect a positive terminal of the third battery module to a negative terminal of the second battery module, and a third busbar connecting the BDU to a negative terminal of the first battery module. Additionally, the six busbars include a fourth busbar arranged to connect the BDU to a positive terminal of the second battery module, a fifth that connects the BDU to a negative terminal of the third battery module, and a sixth busbar that connects BDU to a positive terminal of the fourth battery module.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
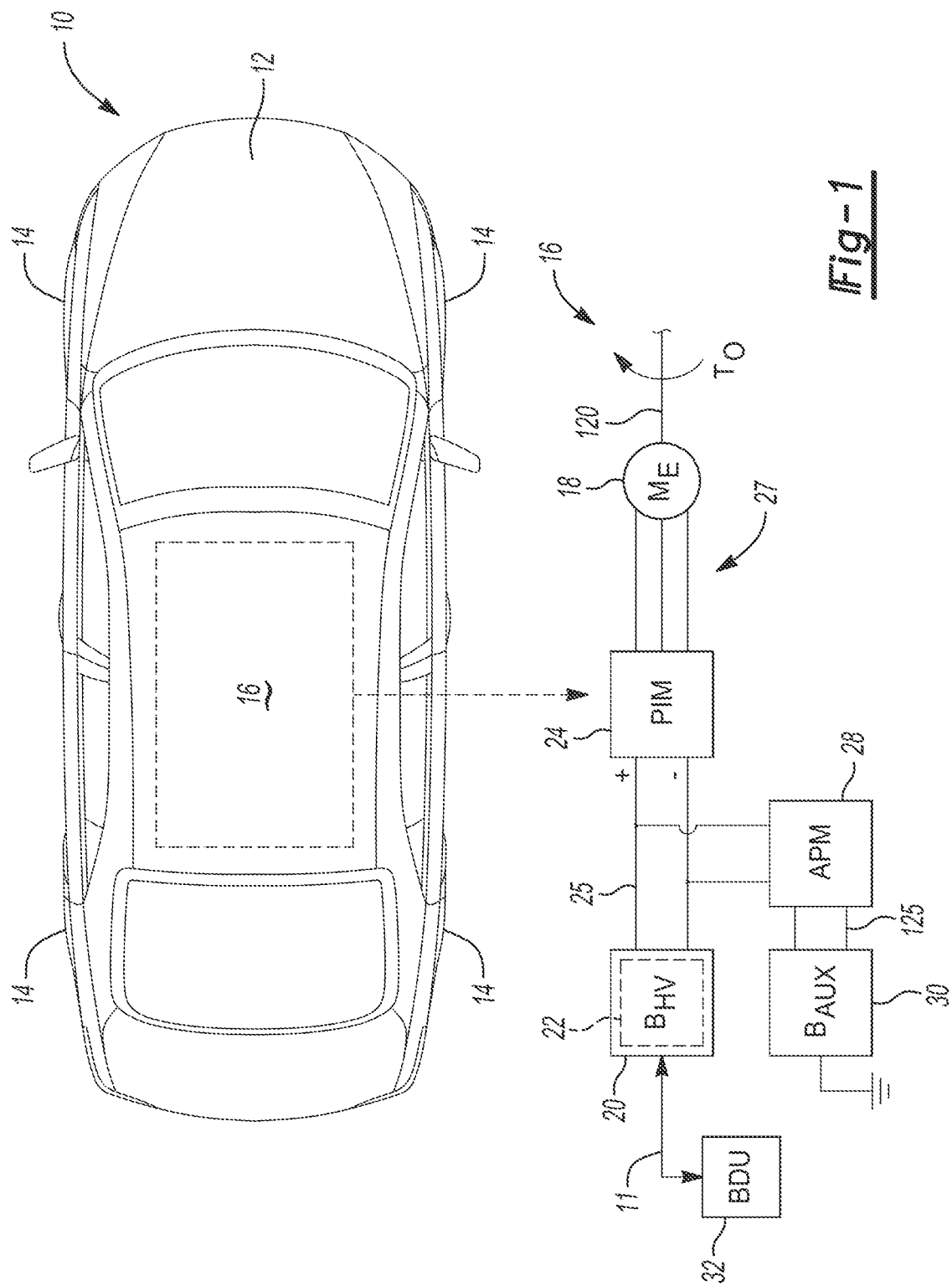
FIG. 1 is an exemplary motor vehicle having a battery electric system equipped with a high-voltage (HV) propulsion battery pack constructed with parallel-connected battery modules and as set forth herein.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, wherein like reference numbers refer to like features throughout the several views, FIG. 1 depicts a motor vehicle 10 having a vehicle body 12 connected to a set of road wheels 14. Additionally, the motor vehicle 10 includes a battery electric system 16 operable for providing sufficient electrical energy for powering one or more of the road wheels 14. For instance, a rotary electric machine ($M_E$) 18 may be coupled to one or more of the road wheels 14 via an output member 120. When energized, the electric machine 18 generates an output torque (arrow $T_O$) about the output member 120, thereby rotating the road wheels 14.

The motor vehicle 10 may be variously configured as a hybrid electric vehicle, a pure electric vehicle, or another mobile platform or system in different embodiments, with the present teachings likewise being extendable to stationary systems such as powerplants, hoists, conveyor equipment, etc. For illustrative consistency, however, the battery electric system 16 will be described hereinafter in the context of the motor vehicle 10 being a pure electric vehicle, without limiting the teachings to such an embodiment.

The battery electric system 16 as contemplated herein includes a high-voltage (HV) battery pack (BHV) 20 having a plurality of parallel-connected battery sections 22 in accordance with the present disclosure. The battery sections 22 are described in greater detail below with reference to FIGS. 2 and 3. The battery sections 22 are constructed from an application-suitable electrochemical battery cells 122 (see FIG. 2) of a high-energy battery chemistry, such as but not limited to a lithium-ion or nickel-metal hydride battery chemistry. In a typical embodiment, the rotary electric machine 18 is constructed as a polyphase/alternating current (AC) traction motor. In such a configuration, electrical power for energizing individual phase windings 27 of the rotary electric machine 18 is provided by operation of a power inverter module (PIM) 24, which in turn is electrically connected to the battery pack 20 via an HV bus 25 having positive (+) and negative (−) voltage rails. As appreciated in the art, operation of the PIM 24 occurs via internal semiconductor switching typically using, e.g., pulse width or pulse density modulation techniques. High-speed switching control of IGBTs or other suitably constructed semiconductor switches (not shown) housed within the PIM 24 inverts a DC voltage from the HV battery pack 20 into a polyphase/AC voltage waveform suitable for energizing the phase windings 27 when powering the road wheels 14.

The battery electric system 16 of FIG. 1 includes additional electrical components, some of which are depicted in FIG. 1 and others of which are omitted for illustrative clarity. For example, an auxiliary power module (APM) 28 may be connected to the HV bus 25. The APM 28 is configured as a DC-to-DC voltage converter operable for receiving an input voltage from the HV bus 25 at a high-voltage level, e.g., 400-volts or more, and for outputting a lower auxiliary voltage, nominally 12-volts. An auxiliary battery ($B_{AUX}$) 30, e.g., a lead-acid or lithium-ion battery, is connected to the APM 28 via an auxiliary voltage bus 125, such that the APM 28 may be used to maintain a charge level of the auxiliary battery 30 as needed. When the auxiliary battery 30 is a 12-volt battery in the exemplary embodiment of FIG. 1, the term "low-voltage" refers to nominal 12-volt levels, and the term "high-voltage" refers to total pack voltage levels in excess of such auxiliary levels, or nominally a total pack voltage of 400-volts with a total battery current of 1000-amps in a possible embodiment.

The battery electric system 16 may include a battery disconnect unit (BDU) 32 as part of its overall structure. As appreciated in the art, the BDU 32 is a hardware and software device operable for controlling a connection state of the HV battery pack 20 with respect to the HV bus 25. Although the BDU 32 is shown schematically in FIG. 1 for illustrative simplicity, the BDU 32 in an action implementation includes various electromechanical contactors that are commanded to open or close based on measured/reported battery parameters (double-headed arrow 11) to interrupt or connect one or more high-current conductive paths between the HV battery pack 20 and the various HV components of the motor vehicle 10. The BDU 32 is also configured to measure and report the battery parameters (double-headed arrow 11), e.g., individual cell, module, section, or pack voltages and currents, temperatures, states of charge, and/or other values, and to report the same to a resident battery system manager (not shown). The open/closed states controlled by the BDU 32 are generally determined based on the present operating state of the battery electric system 16 and other factors, as appreciated in the art.

Figure 2:
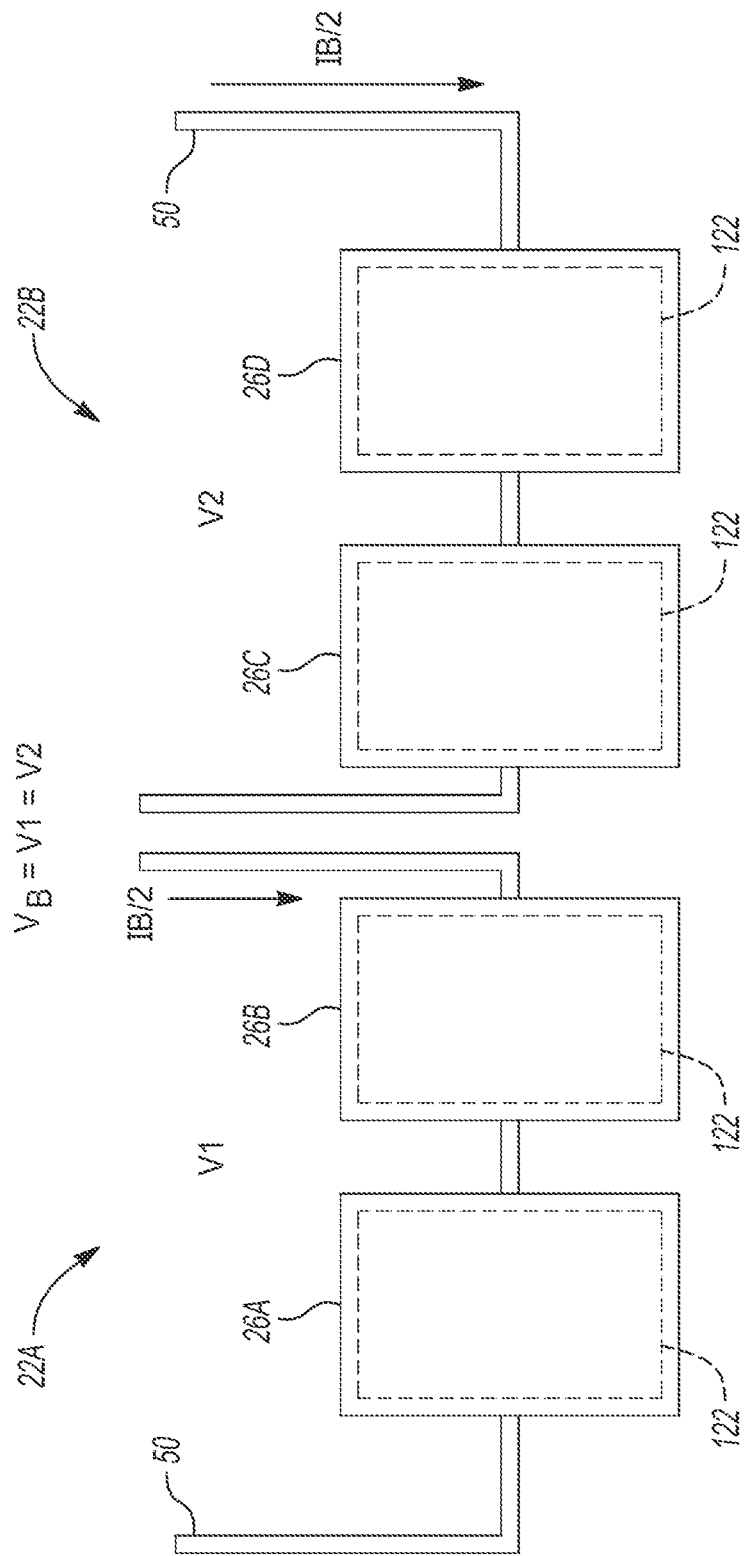
FIG. 2 is a schematic illustration of an exemplary high-level circuit topology for implementing the present teachings when constructing the battery pack of FIG. 1.

Referring now to FIG. 2, the HV battery pack 20 of FIG. 1 is separated herein into parallel-connected battery sections 22, including first and second battery sections 22A and 22B, respectively. Each of the first and second battery sections 22A and 22B have a corresponding section voltage V1 and V2. As the first and second battery sections 22A and 22B are connected in parallel as set forth herein, the HV battery pack 20 of FIG. 1 has a battery voltage $V_B$, i.e., a total voltage capability, that is equal to the section voltages, i.e., $V_B=V1=V2$. Solely for illustrative simplicity, the respective first and second battery sections 22A and 22B are shown as having two battery modules 26 each, i.e., with first battery section 22A including battery modules 26A and 26B, and with second battery section 22B having battery modules 26C and 26D.

Transfer conductors 50, exemplified herein as an electrically conductive busbar, or alternatively as wires or cables, may be constructed of copper, aluminum, or another suitable conductive material, and are arranged to conduct a total battery current represented herein as $I_B$. In a series-connected configuration, i.e., one in which nominal first, second, third, and fourth battery modules 26A, 26B, 26C, and 26D are connected in series, the transfer conductors 50 are rated for the full amount of the total battery current. For example, if the HV battery pack 20 of FIG. 1 provides a total battery pack current of 1000-amps, the transfer conductors 50 would likewise be sized to 1000-amps. However, the illustrated parallel-connected configuration of FIG. 2 enables the use of transfer conductors 50 that are instead rated for just half of the above-noted total battery current $I_B$, i.e., or $$\frac{I_B}{2},$$

500-amps in the non-limiting 1000-amp example of the total battery current h.

As explained below with particular reference to FIG. 3, the parallel-connected configuration of FIG. 2 requires an additional connection relative to the series-connected alternative. However, due to the opportunity to downsize such connections to half of the battery pack current, i.e., $$\frac{I_B}{2},$$

the transfer conductors 50 are constructed with a reduced cross-sectional area, and thus a reduced mass. Moreover, emerging electrified powertrains for high-performance electric vehicles tend to require ever-increasing battery currents. The need to handle a higher battery current, however, requires the transfer conductors 50 to be substantially upsized. Constructing an HV battery pack 20 with transfer conductors 50 rated to handle such demanding current requirements may prove to be difficult given existing mass, weight, and packaging space limits. The parallel configuration of the present HV battery pack 20 therefore provides a practical solution for realizing the full battery current, $I_B$, without also having to upsize the transfer conductors 50 in the manner of a series-connected construction. Although the disclosed solutions require an additional transfer conductor 50, the attendant benefits in mass, weight, and packaging space are still realized.

Figure 3:
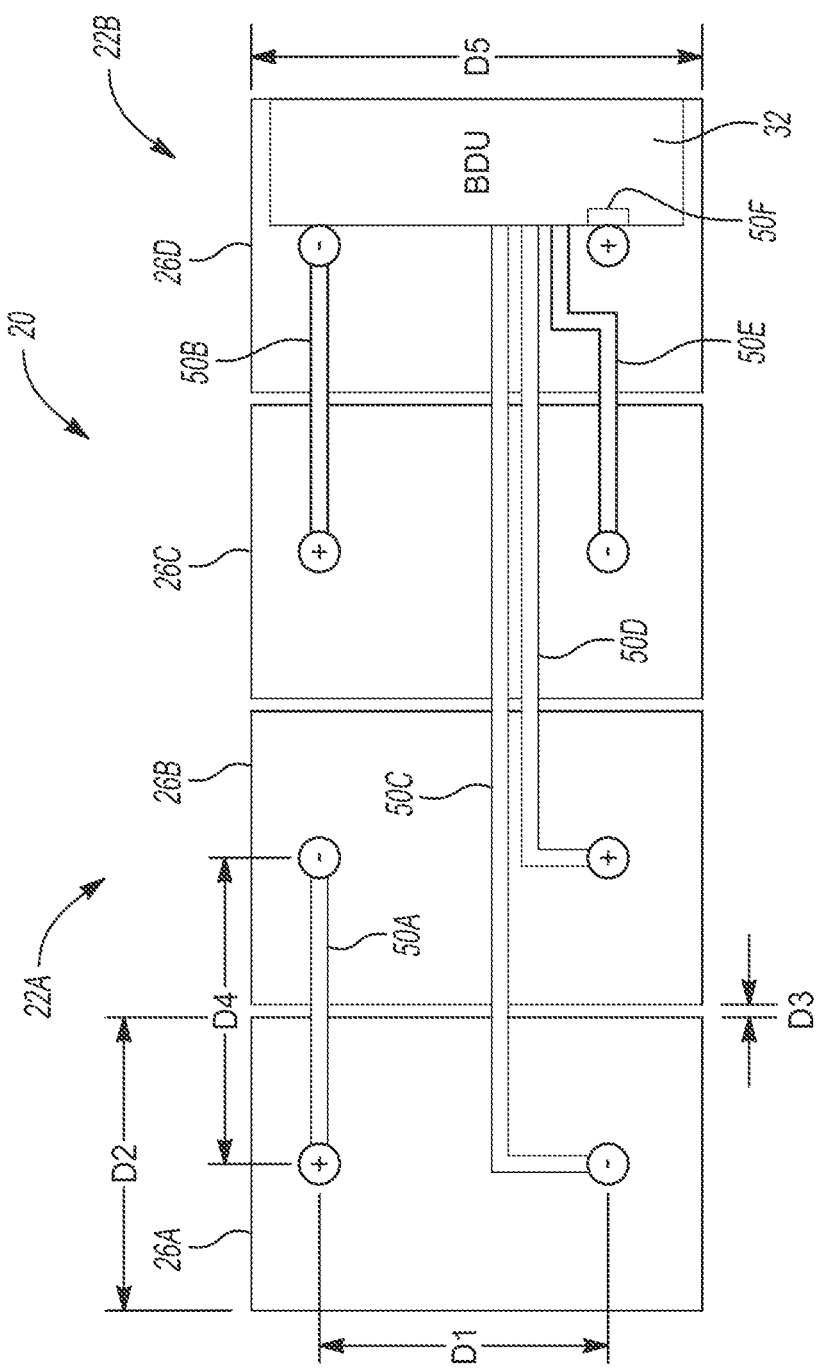
FIG. 3 is a schematic illustration of representative busbar connections for constructing the battery pack of FIG. 2.

Referring now to FIG. 3, the HV battery pack 20 is shown with its constituent first-through-fourth battery modules 26A-26D interconnected to themselves and to the battery disconnect unit (BDU) 32 by six different transfer conductors, i.e., respective first, second, third, fourth, fifth, and sixth transfer conductors 50A, 50B, 50C, 50D, 50E, and 50F. As used herein, "first", "second", "third", "fourth", "fifth", and "sixth" are used in a nominal sense solely to distinguish the different connections, with the underlying construction of the various transfer conductors 50 being otherwise identical other than in relative length. When the BDU 32 is mounted to or adjacent the fourth battery module 26D as shown, the first and second transfer conductors 50A and 50B are of an equal length, the third transfer conductor 50C is a longest of the six transfer conductors 50, and the sixth transfer conductor 50F is the shortest. A representative embodiment of a four-module/two-section construction in FIG. 3 may be of nominal dimensions D1-D5, e.g., with D1 being about 750 mm, D2 about 500 mm, D3 about 15 mm, D4 about 265 mm, and D5 about 1000 mm. Such dimensions are non-limiting, but provide a general idea of the relative size in a possible implementation.

In the first battery section 22A, the first transfer conductor 50A extends from a positive terminal (+) of the first battery module 26A to a negative terminal (−) of the second battery module 26B. In the second battery section 22B, the second transfer conductor 50B extends from a positive terminal (+) of the third battery module 26C to a negative terminal (−) of the fourth battery module 26D. As appreciated in the art, the routing of the first and second transfer conductor 50A and 50B is identical to connections used to construct a baseline series-connected configuration. The third transfer conductor 50C interconnects a negative terminal (−) of the first battery module 26A and the BDU 32, with this particular connection likewise being in common with the series-connected configuration.

Unlike the series-connected configuration, the third transfer conductor 50C is constructed using a smaller cross-sectional area and overall mass due to the need to conduct just half of the total battery current $I_B$. Additionally, the respective fourth and fifth transfer conductors 50D and 50E are used in the illustrated parallel-connected configuration of the HV battery pack 20. The fourth transfer conductor 50D interconnects a positive terminal (+) of the second battery module 26B and the BDU 32, while the fifth busbar 50E for its part interconnects the BDU 32 to the negative terminal (−) of the third battery module 26C. The last remaining connection, i.e., the fifth transfer conductor 50F, connects the BDU 32 to the positive terminal (+) of the fourth battery module 26D. Thus, compared to a series-connected configuration of the same four battery modules, i.e., 26A, 26B, 26C, and 26D, the HV battery pack 20 of FIG. 3 uses a total of six transfer conductors 50, which is one more than the total number of transfer conductors 50 needed to interconnect the first and second battery sections 22A and 22B in series. However, as noted above, by placing the first and second battery sections 22A and 22B in a parallel-connected configuration, the first-through-sixth transfer conductors 50A-50F now realize just half of the total battery current $I_B$.

The solution of FIG. 3 is counterintuitive due to the need for an extra transfer conductor when implementing the parallel-connected configuration, relative to implementing a series-connected configuration. However, splitting of the total battery current $I_B$ (see FIG. 2) still enables a collective reduction in total cross-sectional area of the various transfer conductors 50, and thus less overall mass. Substantial mass savings become evident when one compares the two types of competing connection strategies—series and parallel—for an otherwise identically configured battery. Such an example is shown in FIGS. 2 and 3 with respective first and second battery sections 22A and 22B each having two constituent battery modules, i.e., first and second battery modules 26A and 26B for the first battery section 22A, and the third and fourth battery modules 26C and 26D for the second battery section 22B. Due to the parallel connection, a voltage balancing process will occur between parallel strings of battery cells and the various cell groups within a given cell string, which can be achieved via additional software functionality within the scope of the disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A propulsion battery pack for use with a direct current (DC) voltage bus aboard a motor vehicle, comprising:
   a battery disconnect unit (BDU) operable for controlling a connection state of the propulsion battery pack with respect to the DC voltage bus, wherein the propulsion battery back is connected to, and provides a total battery current to, a rotary electric machine of the motor vehicle for propelling the motor vehicle;
   a first battery section having a first battery module and a second battery module each having a corresponding plurality of electrochemical battery cells, wherein the first battery module is connected in a fixed series arrangement with the second battery module;
   a second battery section connected in a fixed parallel arrangement with the first battery section, the second battery section having a third battery module and a fourth battery module each having another corresponding plurality of electrochemical battery cells, wherein the third battery module is connected in a fixed series arrangement with the fourth battery module; and
   six transfer conductors constructed as flat busbars and collectively interconnecting the first battery section, the second battery section, and the BDU, wherein a total battery current of the battery pack is divided equally between the first battery section and the second battery section, and wherein each of the six transfer conductors is rated for half of the total battery current.

2. The propulsion battery pack of claim 1, wherein the flat busbars are flat copper busbars.

3. The propulsion battery pack of claim 1, wherein the transfer conductors include a first transfer conductor and a second transfer conductor, the first transfer conductor connects a positive terminal of the first battery module to a negative terminal of the second battery module, and the second transfer conductor connects a positive terminal of the third battery module to a negative terminal of the second battery module.

4. The propulsion battery pack of claim 3, wherein the transfer conductors include a third transfer conductor forming an elongated connection between the BDU and a negative terminal of the first battery module.

5. The propulsion battery pack of claim 4, wherein the transfer conductors include a fourth transfer conductor that connects the BDU to a positive terminal of the second battery module, and a fifth busbar that connects the BDU to a negative terminal of the third battery module.

6. The propulsion battery pack of claim 5, wherein the transfer conductors include a sixth transfer conductor that connects the BDU to a positive terminal of the fourth battery module.

7. The propulsion battery pack of claim 1, wherein the electrochemical battery cells are lithium-ion battery cells.

8. The propulsion battery pack of claim 1, wherein the propulsion battery pack has a voltage capability of 400-volts, the total battery current is 1000-amps, and the transfer conductors are each rated for 500-amps.

9. A motor vehicle comprising:
   a vehicle body;
   a set of road wheels connected to the vehicle body; and
   a battery electric system that includes:
      a rotary electric machine connected to one or more of the road wheels; and
      a propulsion battery back connected to the rotary electric machine and providing a total battery current thereto, the propulsion battery pack comprising:
         a battery disconnect unit (BDU);
         a first battery section having a first battery module and a second battery module each having a corresponding plurality of electrochemical battery cells, wherein the first battery module is connected in a fixed series arrangement with the second battery module;
         a second battery section connected in a fixed parallel arrangement with the first battery section, and having a third battery module and a fourth battery module each having another corresponding plurality of electrochemical battery cells, wherein the third battery module is connected in a fixed series arrangement with the fourth battery module; and six transfer conductors constructed as flat busbars and collectively interconnecting the first battery section, the second battery section, and the BDU, wherein the total battery current is divided equally between the first battery section and the second battery section, and the six transfer conductors are rated for half of the total battery current.

10. The motor vehicle of claim 9, further comprising a power inverter module (PIM) operable for inverting a direct current (DC) voltage from the propulsion battery pack into an alternating current (AC) voltage, wherein the rotary electric machine is an AC traction motor configured to be energized by the AC voltage from the PIM.

11. The motor vehicle of claim 10, wherein the DC voltage is 400-volts, and the total battery current is 1000-amps.

12. The motor vehicle of claim 9, wherein each one of the six transfer conductors is constructed from copper.

13. The motor vehicle of claim 9, wherein the six transfer conductors include a first flat busbar and a second flat busbar, the first flat busbar connects a positive terminal of the first battery module to a negative terminal of the second battery module, and the second flat busbar connects a positive terminal of the third battery module to a negative terminal of the second battery module.

14. The motor vehicle of claim 13, wherein the six transfer conductors include a third flat busbar forming an elongated connection between the BDU and a negative terminal of the first battery module.

15. The motor vehicle of claim 14, wherein the six transfer conductors include a fourth flat busbar that connects the BDU to a positive terminal of the second battery module, and a fifth flat busbar that connects the BDU to a negative terminal of the third battery module.

16. The motor vehicle of claim 15, wherein the six transfer conductors include a sixth flat busbar that connects BDU to a positive terminal of the fourth battery module.

17. A propulsion battery pack for use with a direct current (DC) voltage bus aboard a motor vehicle having an electric traction motor, comprising:

a battery disconnect unit (BDU);

a first battery section having a first battery module and a second battery module each having a corresponding plurality of electrochemical battery cells, wherein the first battery module is connected in a fixed series arrangement with the second battery module;

a second battery section connected in a fixed parallel arrangement with the first battery section, and having a third battery module and a fourth battery module each having another corresponding plurality of electrochemical battery cells, wherein the third battery module is connected in a fixed series arrangement with the fourth battery module; and six flat busbars collectively interconnecting the first battery section, the second battery section, and the BDU, wherein a total battery current of the propulsion battery pack is divided equally between the first battery section and the second battery section, and the six flat busbars are each rated for half of the total battery current, wherein the six flat busbars include:

a first flat busbar arranged to connect a positive terminal of the first battery module to a negative terminal of the second battery module;

a second flat busbar arranged to connect a positive terminal of the third battery module to a negative terminal of the second battery module;

a third flat busbar connecting the BDU to a negative terminal of the first battery module;

a fourth flat busbar arranged to connect the BDU to a positive terminal of the second battery module;

a fifth flat busbar arranged to connect the BDU to a negative terminal of the third battery module; and a sixth flat busbar arranged to connect the BDU to a positive terminal of the fourth battery module, wherein the propulsion battery back is connected to, and provides a total battery current to, the electric traction motor of the motor vehicle.

18. The propulsion battery pack of claim 1, wherein the battery pack is a propulsion battery pack configured to power a rotary electric machine aboard a motor vehicle, and the electrochemical battery cells are lithium-ion battery cells.

19. The propulsion battery pack of claim 18, wherein the propulsion battery pack has a total pack voltage of 400-volts and the total battery current is 1000-amps.

20. The propulsion battery pack of claim 17, wherein the BDU is mounted to or adjacent the fourth battery module, the first flat busbar and the second flat busbar are of an equal length, the third flat busbar is a longest one of the six flat busbars, and the sixth flat busbar is a shortest one of the six flat busbars.

* * * * *